United States Patent
Ohly

(10) Patent No.: US 7,533,920 B2
(45) Date of Patent: May 19, 2009

(54) SELECTIVELY DETACHABLE TAILGATE HINGE ASSEMBLY

(75) Inventor: Benjamin G. Ohly, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 371 days.

(21) Appl. No.: 11/586,865

(22) Filed: Oct. 26, 2006

(65) Prior Publication Data

US 2008/0100085 A1 May 1, 2008

(51) Int. Cl.
*B62D 33/03* (2006.01)

(52) U.S. Cl. ..................... 296/53; 296/57.1; 296/146.11

(58) Field of Classification Search .................... 296/50, 296/52, 53, 57.1, 146.4, 146.8, 146.11; 16/223
See application file for complete search history.

(56) References Cited

U.S. PATENT DOCUMENTS

| | | | | |
|---|---|---|---|---|
| 3,838,234 A | * | 9/1974 | Peterson | 200/61.7 |
| 3,842,386 A | * | 10/1974 | Suska | 439/31 |
| 3,857,625 A | * | 12/1974 | Crane et al. | 439/31 |
| 4,412,711 A | * | 11/1983 | Suska | 439/31 |
| 4,839,939 A | * | 6/1989 | O'Brien, II | 16/223 |
| 5,004,287 A | * | 4/1991 | Doyle | 296/57.1 |
| 5,154,565 A | | 10/1992 | Bourgeois | |
| 5,449,212 A | | 9/1995 | Seifert | |
| 5,586,895 A | * | 12/1996 | Zehrung | 439/165 |
| 6,068,321 A | | 5/2000 | Ooms | |
| 6,091,938 A | * | 7/2000 | Go | 455/575.3 |
| 6,135,538 A | * | 10/2000 | Serizawa et al. | 296/146.7 |
| 6,196,609 B1 | | 3/2001 | Bowers | |
| 6,217,097 B1 | | 4/2001 | Rogers, Jr. et al. | |
| 6,276,743 B1 | | 8/2001 | Jyawook et al. | |
| 6,295,358 B1 | * | 9/2001 | Kubota | 379/433.13 |
| 6,354,651 B1 | * | 3/2002 | Mori | 296/146.1 |
| 6,357,813 B1 | | 3/2002 | Vandeberghe et al. | |
| 6,588,151 B1 | | 7/2003 | Goscicki et al. | |
| 6,752,655 B1 | * | 6/2004 | Kaczmarek | 439/546 |
| 6,773,047 B2 | | 8/2004 | Gruber | |
| 6,793,264 B1 | | 9/2004 | Muller et al. | |
| 6,805,393 B1 | * | 10/2004 | Stevenson et al. | 296/50 |
| 6,818,827 B2 | * | 11/2004 | Kato et al. | 174/72 A |
| 7,053,304 B2 | * | 5/2006 | Ojima et al. | 174/72 A |
| 7,423,224 B2 | * | 9/2008 | Puhl | 174/650 |
| 2001/0033091 A1 | | 10/2001 | Rogers, Jr. et al. | |
| 2004/0032141 A1 | | 2/2004 | Moyna | |
| 2004/0108743 A1 | | 6/2004 | Gruber | |
| 2005/0148212 A1 | * | 7/2005 | Ojima et al. | 439/34 |

(Continued)

*Primary Examiner*—Jason S Morrow
(74) *Attorney, Agent, or Firm*—Global IP Counselors, LLP

(57) ABSTRACT

A selectively detachable tailgate hinge assembly connects a tailgate to a vehicle. The hinge assembly has a hinge mechanism, a first wiring harness, and a second wiring harness. At least a first portion of the hinge mechanism may be selectively detached from a second portion of the hinge. The first wiring harness operatively connects to at least one component within a tailgate and further has a first electrical contact that is positioned within the first portion of the hinge mechanism. The second wiring harness operatively connects to a power source positioned in the vehicle and further has a second electrical contact that is positioned within the second portion of the hinge mechanism. The electrical contacts are electrically engaged with one another when the hinge mechanism is assembled and electrically disengaged when the first portion of the hinge mechanism is detached from the second portion of the hinge mechanism.

21 Claims, 9 Drawing Sheets

U.S. PATENT DOCUMENTS

2007/0132264 A1* 6/2007 Koneval et al. ............ 296/57.1
2008/0054667 A1* 3/2008 Ohly ........................ 296/57.1
2008/0224494 A1* 9/2008 Anderson et al. .......... 296/57.1

* cited by examiner

SELECTIVELY DETACHABLE TAILGATE HINGE ASSEMBLY

TECHNICAL FIELD

Described herein is an illustrative selectively detachable tailgate hinge assembly for a motor vehicle.

BACKGROUND

Various types of motor vehicles, such as pickup trucks and SUTs (sport utility trucks), are provided with tailgates that provide access to cargo beds. The tailgates for these vehicles are often hinged at the bottom and operatively connected to the rear end of the cargo bed. To access the cargo bed, the tailgate may be opened and closed, either manually or by a power control apparatus. When in the closed position, the tailgate is secured to the vehicle using fork-bolt type latches on lateral edges of the tailgate that operatively engage with striker pins extending from sidewalls of the cargo bed.

In some instances, it may be desirable to selectively remove the tailgate from the vehicle. However, with conventional hinge mechanisms, removal of the tailgate requires specific tools and removal is often cumbersome. The detachability of the tailgate is even more problematic in vehicles where the tailgate may carry components that need to be electrically connected to a power source. For example, in a tailgate that utilizes a power control apparatus to release or engage the latching mechanism, it is necessary that the tailgate be electrically connected a power source, which entails providing suitable wiring that extends from the tailgate into a portion of the vehicle body where the power source is located. However, in instances where it may be desirable to selectively detach a tailgate from the vehicle, the wiring leading from the tailgate to the vehicle body becomes problematic in that it cannot be easily detached without destroying the wiring. Accordingly, there is a need for tailgate hinge mechanism that may be used to selectively remove the tailgate from a vehicle with minimal effort, as well as a need for a tailgate wiring system for providing power to the tailgate that may be easily detached to permit selective detachment of the tailgate from a vehicle body with minimal effort.

SUMMARY

A selectively detachable tailgate hinge assembly for connecting a tailgate to a vehicle is disclosed. The hinge assembly comprises a hinge mechanism, a first wiring harness, and a second wiring harness. The hinge mechanism connects a portion of the tailgate to a portion of a vehicle. At least a first portion of the hinge mechanism may be selectively detached from a second portion of the hinge mechanism which permits the tailgate to be selectively removed from the vehicle.

The first wiring harness operatively connects to at least one component within a tailgate. The first wiring harness further comprises a first electrical contact that is positioned within the first portion of the hinge mechanism. The second wiring harness operatively connects to a power source positioned in the vehicle. The second wiring harness further comprises a second electrical contact that is positioned within the second portion of the hinge mechanism. The first and second electrical contacts are electrically engaged with one another when the hinge mechanism is assembled and electrically disengaged when the first portion of the hinge mechanism is detached from the second portion of the hinge mechanism.

BRIEF DESCRIPTION OF THE DRAWINGS

The features and inventive aspects of the present invention will become more apparent from the following detailed description, the appended claims, and the accompanying drawings, of which the following is a brief description:

DETAILED DESCRIPTION

Figure 1:
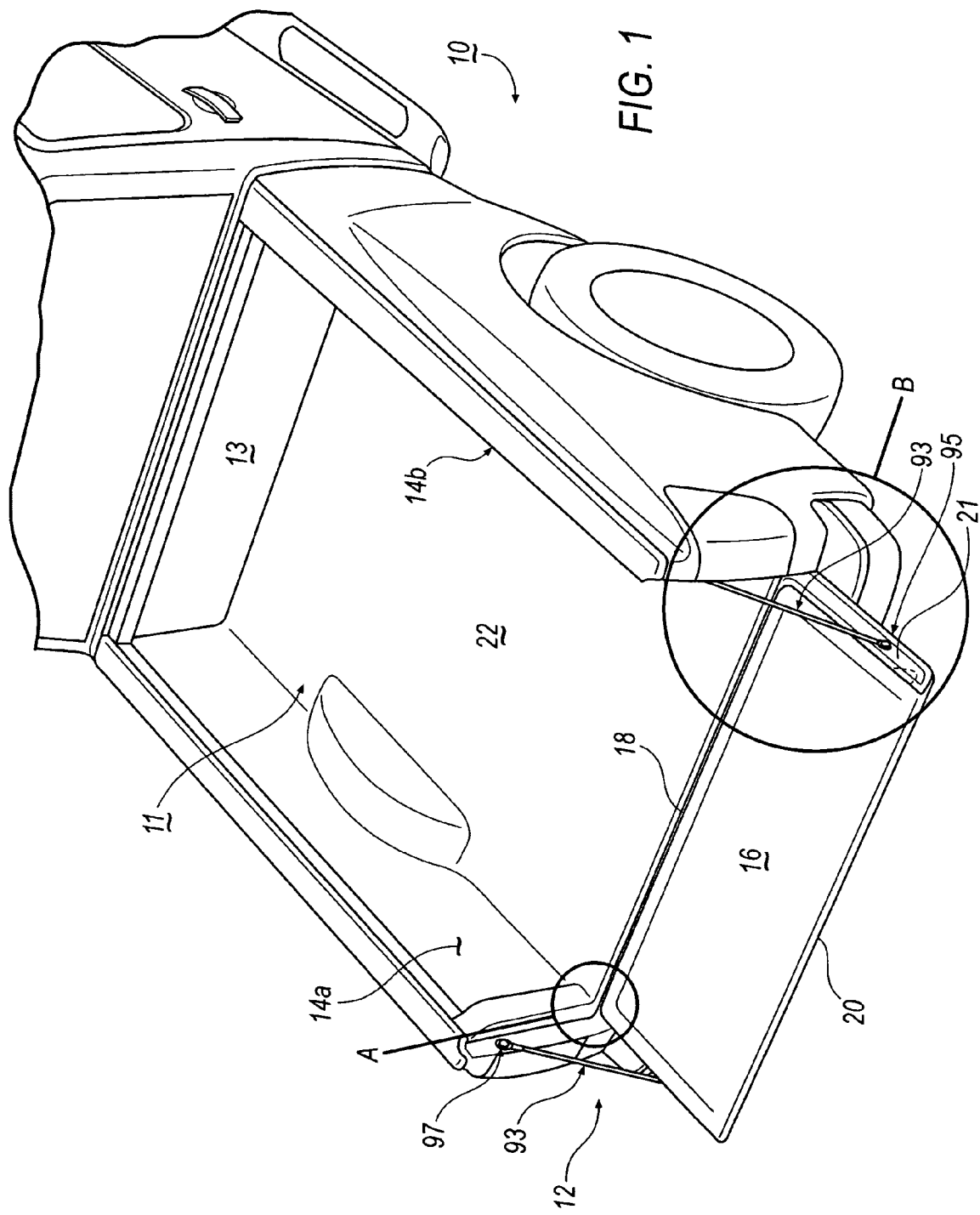
FIG. 1 is a perspective view of the rear end of a vehicle equipped with a selectively detachable tailgate hinge assembly and illustrating a tailgate in an open position.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of a power tailgate hinge assembly of the present invention will now be described in connection with its use on a vehicle.

Figure 2:
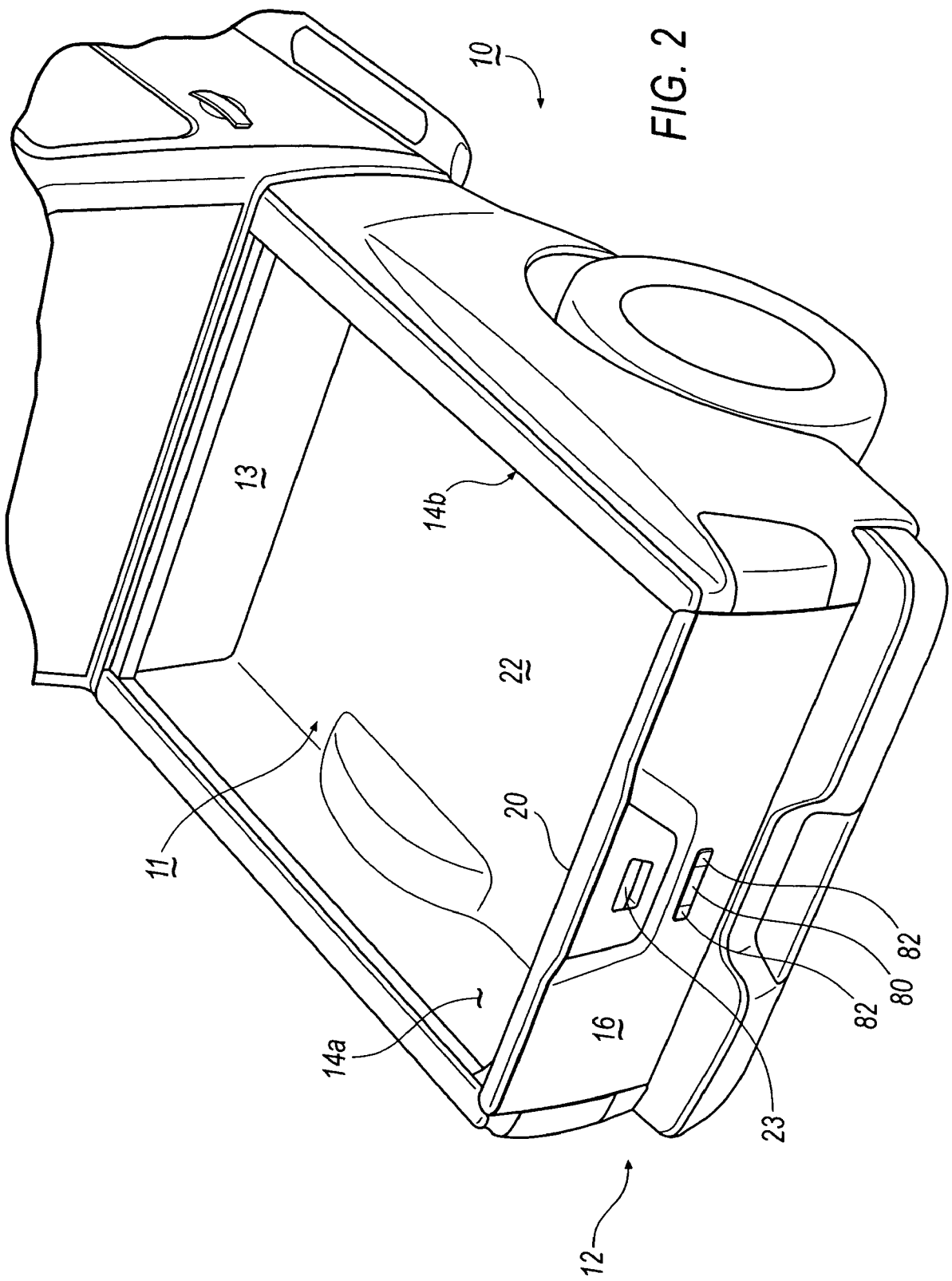
FIG. 2 is a perspective view of the rear end of the vehicle of FIG. 1 with the tailgate in a closed position.

Referring to FIG. 1, there is shown a vehicle 10 having a cargo bed 11. The cargo bed 11 is generally defined by a floor portion 22, a front wall 13, two laterally spaced side walls 14a, 14b and a selectively movable tailgate 16. Tailgate 16 includes a first end 18 and a second end 20. The first end 18 of tailgate 16 is hingedly connected to a portion of a rear end 12 of the vehicle. Tailgate 16 is movable between a closed position and an open position. When tailgate 16 is in the closed position, tailgate 16 is generally perpendicular to the floor portion 22 (as seen in FIG. 2). A latching mechanism (not shown), such as a fork bolt type latch or other suitable latching mechanism, is provided on respective side edges 21 of tailgate 16. Each latching mechanism engages a corresponding latch member (not shown) such as a striker pin, that is positioned on a portion of side walls 14a and 14b adjacent the rear end 12 of vehicle 10 to secure tailgate 16 in the closed position.

Once tailgate 16 is in the closed position, the latching mechanism may be actuated to release the latching mechanism from the latch member. In one embodiment, the latching mechanism may be manually released from the latch member by operating a handle 23 (best seen in FIG. 2) that is attached to outer surface of tailgate 16. In another embodiment, as disclosed in co-pending U.S. patent application Ser. No. 11/513,864, the disclosure of which is incorporated in its entirety by reference, a power source operatively connected to tailgate 16 serves to release the latching mechanism. In such an embodiment, the power source may be configured to release the latching mechanism from the latch member in response to a signal from an actuation member such as a button on a key fob, or an actuation button positioned on vehicle 10. In either embodiment, once released from the closed position, tailgate 16 may be lowered into the open position, whereby tailgate 16 is generally coplanar with the floor portion 22, as shown in FIG. 1.

As discussed above, tailgate 16 is hingedly connected to vehicle 16 by a pair of hinge mechanisms. Hinge mechanisms may be manually operated hinge mechanisms, power operated hinge mechanisms, or a combination of a manually operated hinge mechanism and a power operated hinge mechanism.

Figure 11:
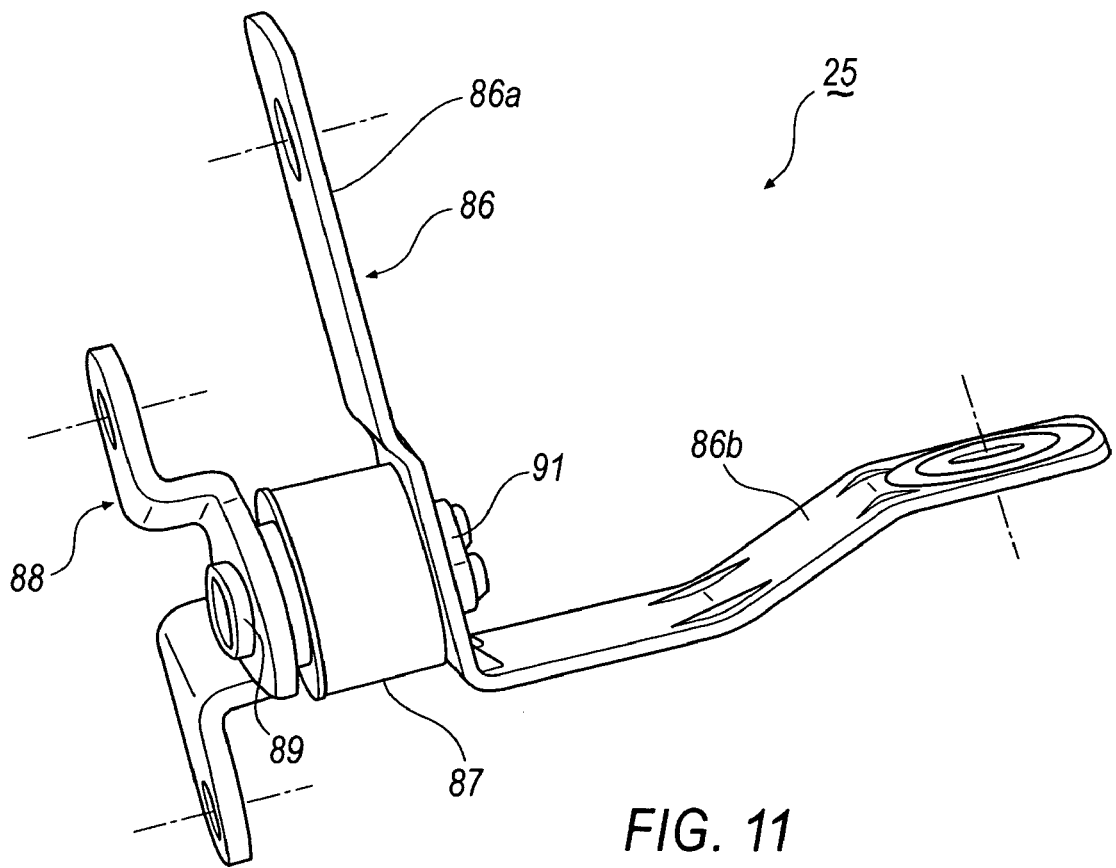
FIG. 11 is a perspective view of a manual selectively detachable hinge mechanism.

In one specific embodiment, tailgate 16 is connected to vehicle 16 by first and second hinge mechanisms 25 and 26, respectively. First hinge mechanism 25 (as best seen in FIG. 11) is a conventional detachable hinge mechanism that is used with tailgates that are manually moved between the open and closed positions. First hinge mechanism 25 will be described in further detail below.

Second hinge mechanism 26 (best seen in FIGS. 4-9) may be connected to a power assembly 24 (FIG. 9) that raises and lowers tailgate 16 in response to an actuation device. Second hinge mechanism 26 includes a tailgate bracket 28 and a drive cup 30. In one embodiment, tailgate bracket 28 is generally L-shaped and is positioned with a first leg 28a secured to side edge 21 of tailgate 16 and second leg 28b secured to first end 18 of tailgate 16. Power assembly 24 (to be explained further below) may be actuated to open and close tailgate 16.

In one embodiment, an optional lever arm 32 may also be included in second hinge mechanism 26. Lever arm 32 comprises a body portion 33a, a leg portion 33b, and a foot portion 33c. Leg portion 33b connects foot portion 33c to body portion 33a. Foot portion 33c and body portion 33a are generally parallel to one another, with leg portion 33b being angled outwardly so as to space foot portion 33c a predetermined distance inboard from body portion 33a.

A driveshaft 34 (an example of which may be seen in FIG. 8) is provided which may operatively connect to a clevis 36 for engagement with an actuation member of power assembly 24. In one embodiment, (as specifically shown in FIG. 8), driveshaft 34 is integrally formed with lever arm 32. In such an embodiment, driveshaft 34 includes a first portion 34a that is positioned on one side of lever arm 32, and a second portion 34b that is positioned on a second side of lever arm.

Figure 4:
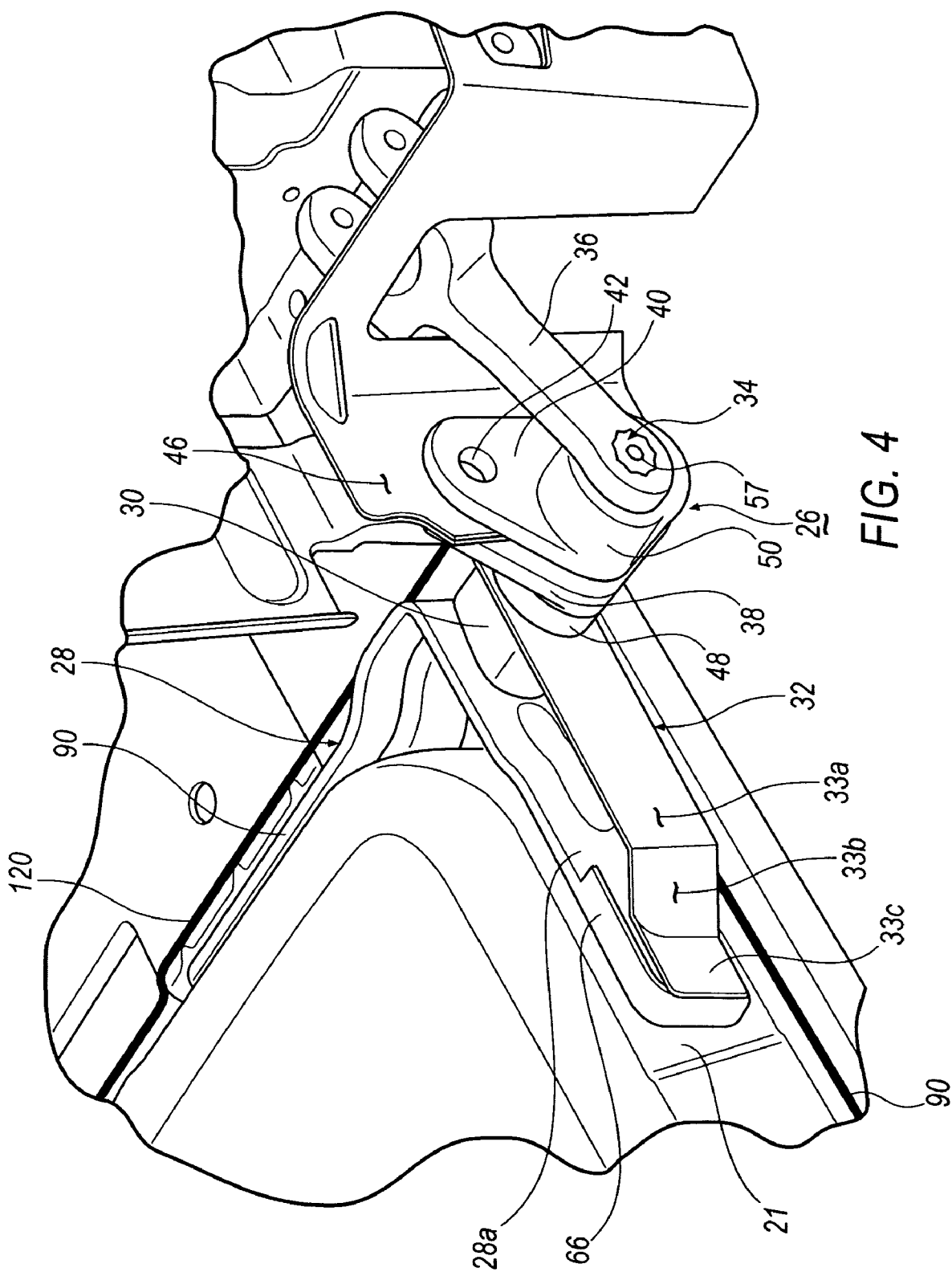
FIG. 4 is an enlarged side view of a portion of the vehicle, illustrating a hinge mechanism for a tailgate assembly that is operatively connected to a power assembly.
Figure 5:
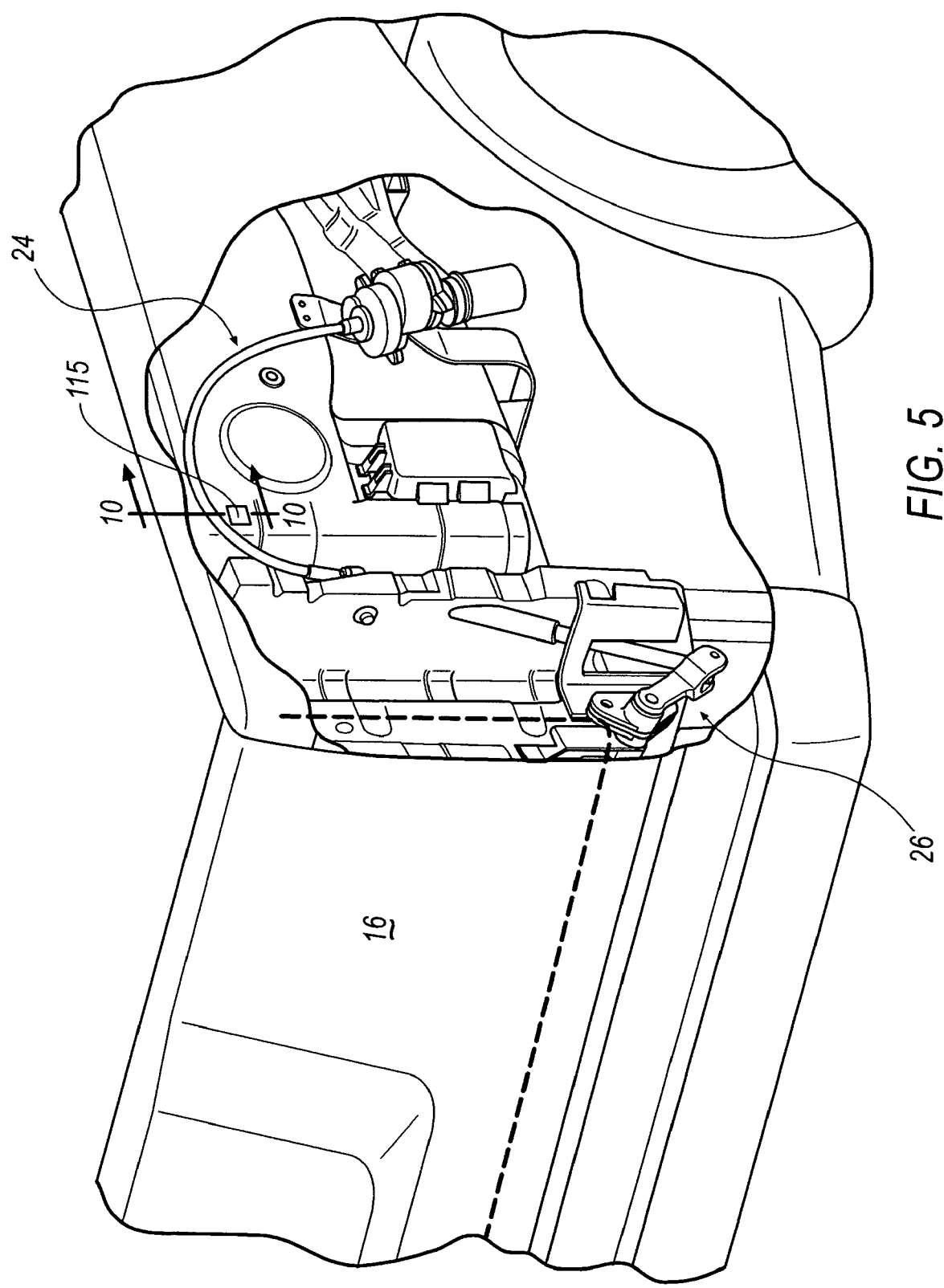
FIG. 5 is a perspective view of one embodiment of a selectively detachable tailgate hinge assembly engaged to one side of the tailgate taken from encircled area B of FIG. 1.
Figure 6:
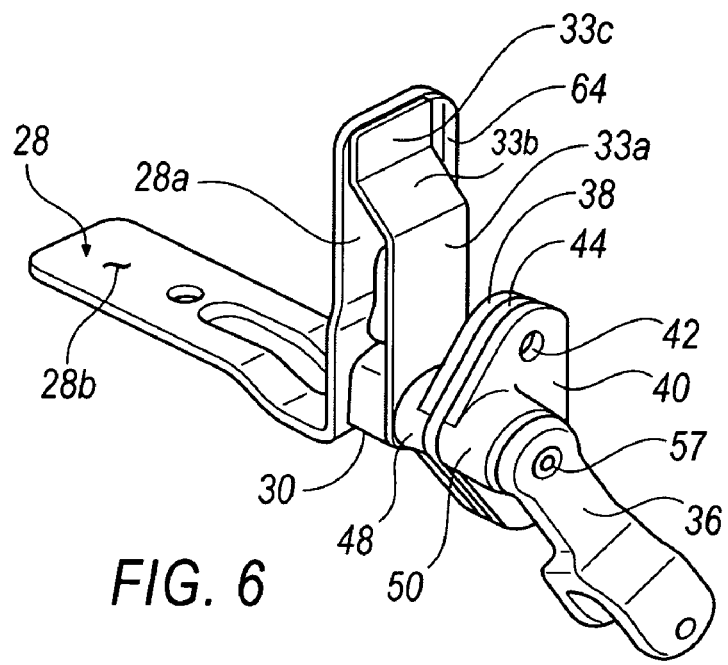
FIG. 6 is a perspective view of the hinge mechanism of FIG. 4 removed from the tailgate.
Figure 7:
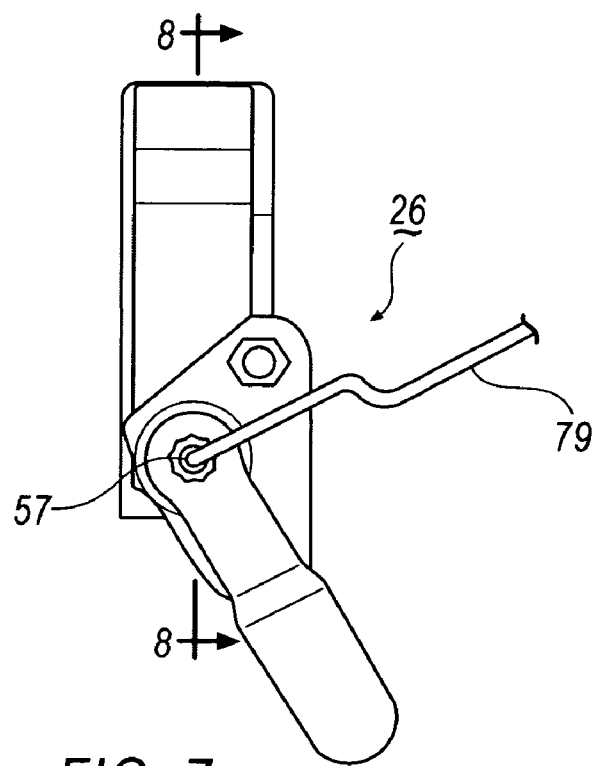
FIG. 7 is a side elevational view of an embodiment of a selectively detachable tailgate hinge mechanism.

Hinge mechanism 26 may further include one or more support brackets for attaching hinge mechanism 26 to a vehicle frame. As shown in FIG. 4, in one embodiment, hinge mechanism 26 includes an inner support bracket 38 and an outer support bracket 40. Inner and outer support brackets 38 and 40 are received on driveshaft 34 and further include one or more attachment openings 42. Inner and outer support brackets 38 and 40 are assembled so as to form a small gap 44 (best seen in FIG. 8) therebetween. Gap 44 receives a portion of a vehicle body structure 46 (best seen in FIGS. 4 and 9) therein. A fastening element 47, such as a screw and nut assembly for example, engages attachment openings 42 to secure inner and outer support brackets 38 and 40 to vehicle body structure 46.

In one embodiment, inner and outer support brackets 38 and 40 further include outwardly extending collars 48 and 50. Collars 48 and 50 are oriented so as to extend from outside surfaces 52 and 54 of inner and outer support brackets 38 and 40. Collars 48 and 50 may further be equipped with bearing sleeves (not shown) that receive driveshaft 34 to insure that driveshaft 34 rotates independent of support brackets 38 and 40. In one embodiment, collars 48 and 50 are integral with support brackets 38 and 40.

Hinge mechanism 26 is further equipped with a pathway for providing an electrical connection between components within tailgate 16 and a power source within vehicle 10. More specifically, a pathway 57 is formed through driveshaft 34, as may be seen in FIG. 8. Drive cup 30, which attaches to an end of second portion 34b of driveshaft 34, further includes a groove 59 formed in a front portion 60. Groove 59 is in communication with a channel 61 that extends through an opposite end portion 62 of drive cup 30. Groove 59 is somewhat larger than channel 61. A cap 63 is connected to end portion 62 of drive cup 30 by any suitable means. In one embodiment, cap 63 may be frictionally engaged with end portion 62 by mounting protrusions (not shown) that mate with corresponding mounting apertures (not shown). Alternatively, cap 63 may be secured using a suitable sealant. Cap 63 further includes a pathway 65 for a first wiring harness 67 to extend therethrough. When cap 63 is secured to drive cup 30 and drive cup 30 is attached to driveshaft 34, pathway 65 is generally axially aligned with pathway 57.

Figure 8:
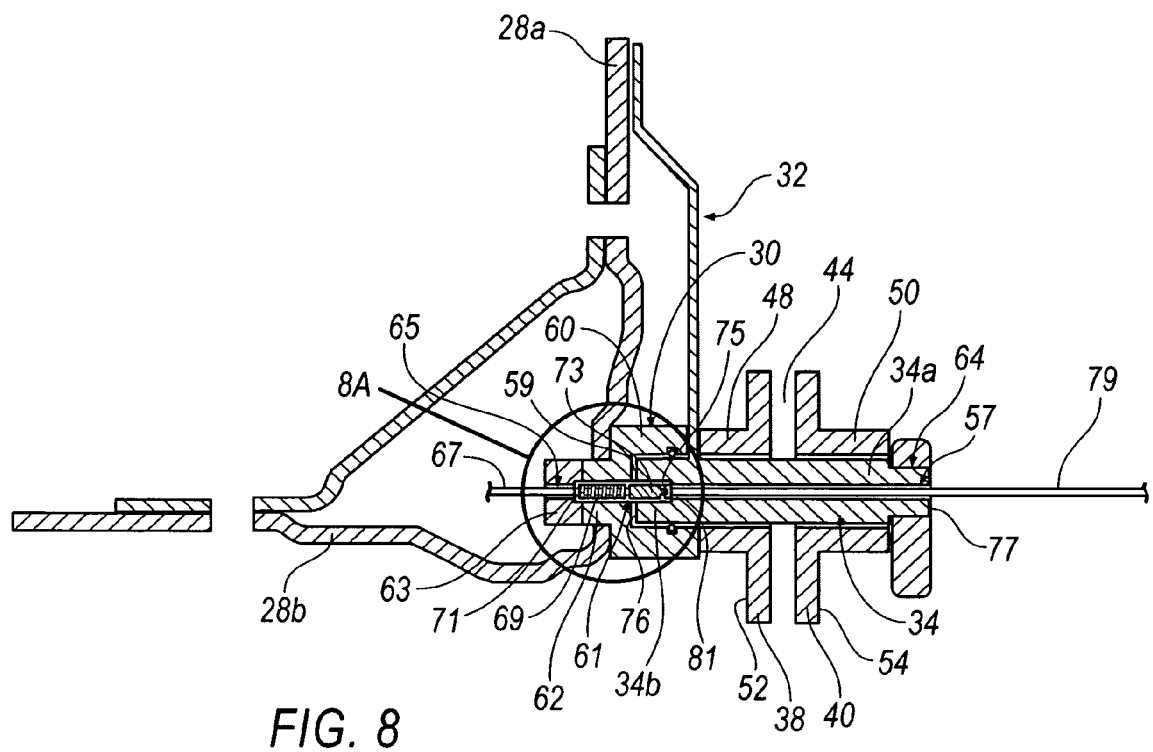
FIG. 8 is a cross-sectional view of the selectively detachable tailgate hinge mechanism taken along lines 8-8 of FIG. 7

One end (not shown) of first wiring harness 67 may be electrically connected to various components requiring power that are positioned in tailgate 16. As shown in FIG. 8, a portion of first wiring harness 67 extends through a spring member 69. Spring member 69 is partially disposed within a mounting seat 71 formed in cap 63 and channel 61 of drive cup 30. A distal end of first wiring harness 67 is connected to a first electrical contact 73.

In the embodiment shown in FIG. 8, second portion 34b of driveshaft 34 is formed with a groove 75 that extends inwardly from a second end 76 thereof. Pathway 57 is in communication with groove 75, extending through a first end 77 of first portion 34a of driveshaft 34.

Figure 8A:
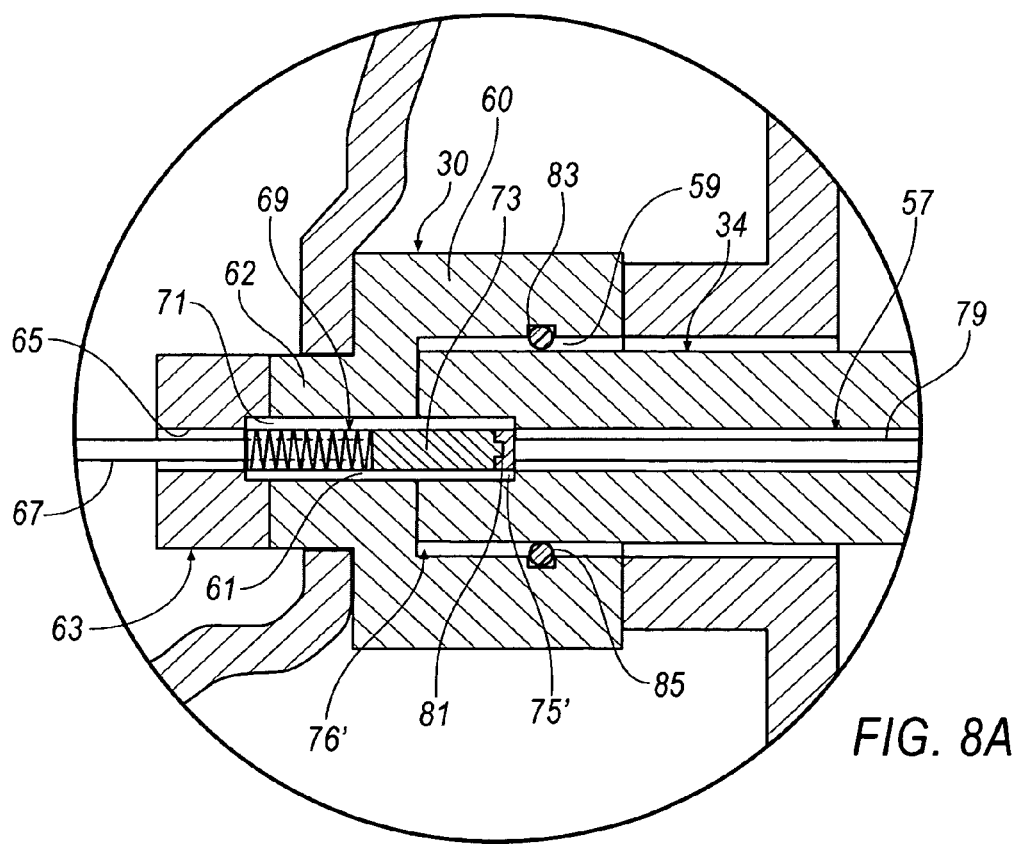
FIG. 8A is a cross-sectional view of an alternative embodiment of the hinge mechanism of FIG. 8.

Alternatively, as shown in FIG. 8A, in an embodiment that does not include a lever arm 32, second end 76' of driveshaft 34 includes a groove 75'. Groove 75' is in communication with pathway 57.

A second wiring harness 79 includes a distal end that is connected to a second electrical contact 81. Second electrical contact 81 is positioned within groove 75/75' and wiring harness 79 extends through pathway 57 and into the vehicle body. An end of wiring harness 79 is operatively connected to power assembly 24.

Hinge assembly 26 is assembled as follows. Driveshaft 34 is preloaded with second wiring harness 79 such that second electrical contact 81 positioned within groove 75/75'. For the embodiment shown in FIG. 8, second portion 34b of driveshaft 34 is press-fit into groove 59 that is formed in front portion 60 of drive cup 30. For the embodiment shown in FIG. 8A where no lever arm 32 is used, second end 76 of driveshaft 34 is positioned within groove 59. In both embodiments, driveshaft 34 is positioned through support brackets 38 and 40. If second hinge mechanism 26 is to be used as a power operated hinge mechanism, clevis 36 may be attached to first end 77 of driveshaft 34. In one embodiment, first end 77 of driveshaft 34 is keyed and received in an aperture 64 of clevis 36 which is correspondingly keyed such that driveshaft 34 will rotate in response to movement by clevis 36.

First electrical contact 73 of first wiring harness 67 is inserted into channel 61 of end portion 62 of drive cup 30. Spring member 73 is disposed around a portion of first wiring harness 67 and is positioned, at least partially, within channel 61, as well. Further, spring member 73 is positioned adjacent first electrical contact 73.

First wiring harness 67 extends through pathway 65 that is formed in cap 63. Cap 63 is then secured to an end of drive cup 30 and mounting seat 71 engages an end of spring member 69. Once cap 63 is secured to end portion 62 of drive cup 30 and driveshaft 34 is positioned within front portion 60 of drive cup 30, the spring force of spring member 69 forces first electrical contact 73 into engagement with second electrical contact 81, thereby electrically connecting first and second wiring harnesses 67, 79 whenever second hinge mechanism 26 is assembled.

In one embodiment, as shown in FIG. 8A, front portion 60 of drive cup 30 may further include an annular groove 83 formed therein. Annular groove 83 is sized so as to retain a sealing member 85, such as an o-ring.

For the embodiment shown in FIG. 8, once drive cup 30 and driveshaft 34 are assembled, foot portion 33c is positioned in contact with first leg 28a of tailgate bracket 28. Because driveshaft 34 is fixedly connected to lever arm 32, as clevis 36 drives driveshaft 34, lever arm 32 will also rotate. Further, foot portion 33c of lever arm 32 may contact a flange 66 that is formed on first leg 28a of tailgate bracket 28, thereby lifting tailgate 16. This arrangement reduces torque on drive cup 30.

A portion of second hinge mechanism 26 may be selectively detached from another portion of second hinge mechanism 26 to as to permit tailgate 16 to be selectively removed from vehicle 10. For example, in one embodiment, drive cup 30 may be disengaged from driveshaft 34. Such action would necessarily disengage first and second electrical contacts 73, 81, and thereby breaking any electrical connection therebetween. However, neither first nor second wiring harnesses 67, 79 will be damaged by the disengagement.

As mentioned above, second hinge mechanism 26 may be connected to power assembly 24, which is described in detail in co-pending U.S. patent application Ser. No. 11/513,864. One function that power assembly 24 may serve is to release the latching mechanism, as well as open and close tailgate 16 in response to an actuation member. In one embodiment, referring to FIG. 9, power assembly 24 includes a screw assembly 72 that is connected to a wire cable 74. A motor assembly 78 operates screw assembly 72. A controller 84 controls motor assembly 78. While power assembly 24 may control the operation of tailgate 16, power assembly 24 may also serve a number of alternative functions. For example, in addition to providing power to tailgate 16 to selectively engage and disengage the latching mechanism (not shown) that secures tailgate 16 to a portion of vehicle 10, power assembly 24 may also provide power to one or more sensors, such as pinch strips 90 to modify operation of tailgate 16 in the event of an obstruction in the path of tailgate 16. For example, sensors may be used to detect whether or not an obstruction is present in the travel path of tailgate 16 as it moves between the open and closed positions that may impede proper closing of tailgate 16. In such an embodiment, the sensors are in electrical communication with controller 84. Based on signals received from the sensors, controller 84 may stop motor assembly 78 from continuing with moving tailgate 16 into the closed position or instruct motor assembly 78 to return tailgate 16 to the open position.

Figure 3:
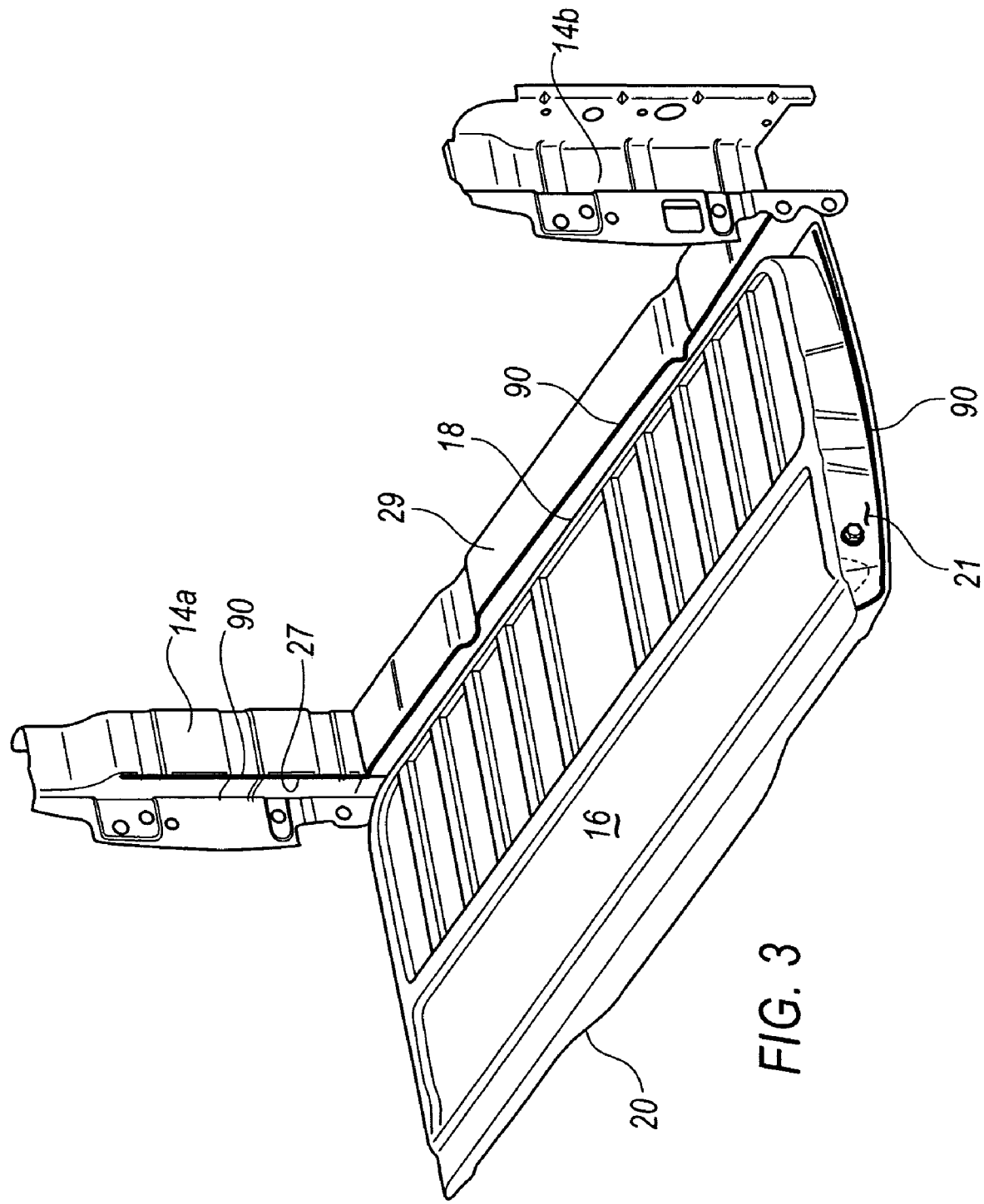
FIG. 3 is a perspective view of the tailgate assembly of FIG. 1 in the open position.

As suggested above, in one embodiment, pinch strips 90 serve as the sensors that are in electrical communication with controller 84. As may be seen, for example, in FIGS. 3 and 4, pinch strips 90 are generally disposed along side edge 21, as well as contact surfaces 27 and 29 of tailgate 16, walls 14a, 14b, and cargo bed 22, respectively. When controller 84 activates motor assembly 78 to move tailgate 16 from an open position to a closed position, pinch strips 90 are utilized to sense if an obstruction is present. If an obstruction is present, controller 84 will stop motor assembly 78 from continuing moving tailgate 16 into the closed position. Controller 84 may also be programmed to automatically return tailgate 16 to the open position when an obstruction is present. Thus, motor assembly 78 is protected from abusive loading and damage due to the presence of an obstruction, and a user is also protected from inadvertent closure of tailgate 16 on a body part.

In addition to controlling opening and closing of tailgate 16, power assembly 24 may further provide power to a rear brake light 80 and/or reverse lights 82 (as best seen in FIG. 2) mounted on tailgate 16 through the electrical connection formed between first electrical contact 73 and second electrical contact 81. More specifically, a distal end (not shown) of first wiring harness 67 is positioned within tailgate 16 and may be connected to a terminal (not shown) that includes additional wiring harnesses in electrical communication with the various components positioned within tailgate 16. Such components include, but are not limited to, one or more brake lights 80, reverse lights 82, pinch strips 90, and/or the latch mechanism.

Figure 9:
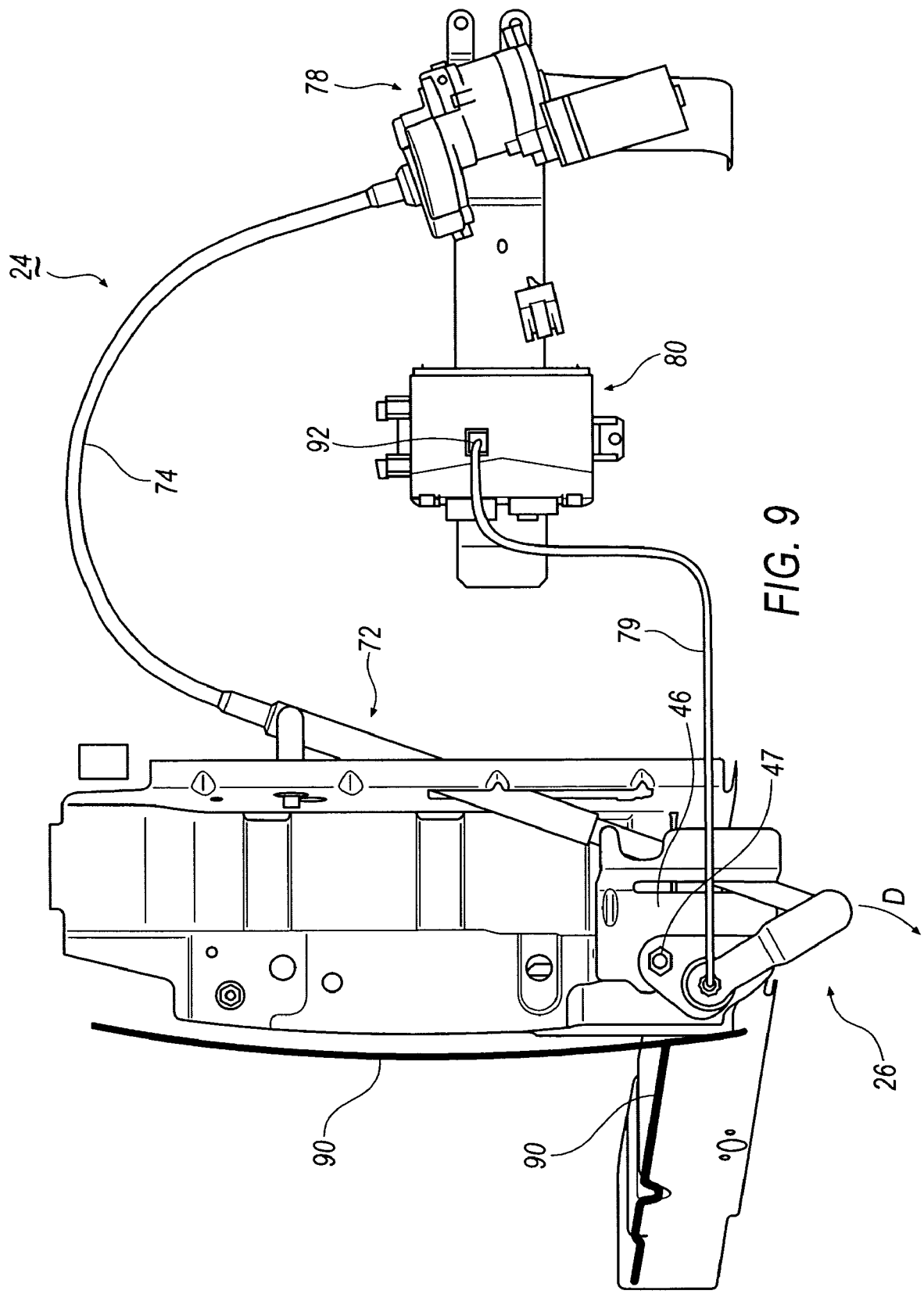
FIG. 9 is an enlarged elevational view of a power assembly of FIG. 1.

A distal connection end 92 of second wiring harness 79 is connected to controller 84, as may be seen in FIG. 9, for example. Thus, when hinge mechanism 26 is assembled, thereby forcing first and second electrical contacts 73, 81 to electrically engage one another, power may be transmitted through hinge mechanism 26 to tailgate 16. Further, because first wiring harness 67 and second wiring harness 79 are retained in different selectively detachable portions of hinge mechanism 26, when hinge mechanism disassembled to permit removal of tailgate 16 from vehicle 10, the electrical connection between first and second contact portions 73, 81 is automatically broken, without damaging wiring harnesses 67, 79. Also, once tailgate 16 is re-installed and hinge mechanism is re-assembled, the electrical connection between first and second contact portions 73, 81 are easily re-established such that power is restored to the various components housed in tailgate 16.

Operation of power assembly 24 with respect to second hinge mechanism 26 will now be described. In operation, a switch 115, which may be located on wall 14a of vehicle 10 (see, e.g., FIG. 11), an interior of vehicle 10, or on a key fob (not shown); sends a signal to controller 84 to move tailgate 16. If tailgate 16 is in the open position, controller 84 causes motor assembly 78 to move components of wire cable 74 in a first direction so as to actuate screw assembly 72, which is connected to clevis 36 of second hinge mechanism 26. Screw assembly 72 then drives clevis 36 downward (indicated by arrow D in FIG. 9), thereby activating second hinge mechanism 26 so as to raise tailgate 16 into the closed position (see FIG. 2), whereby the latching mechanism will be engaged with the mating latching member.

To lower tailgate 16 into the open position (see FIGS. 1 and 3, e.g.), the switch 115 is activated and power assembly 24 releases the latch mechanism. Motor assembly 78 moves components of wire cable 74 in a second direction, such that a portion of second hinge mechanism 26 is rotated upwardly in a direction opposite of arrow D. By this action, second hinge mechanism 26 is activated to permit tailgate 16 to rotate so as to lower tailgate 16 into the open position.

Figure 10:
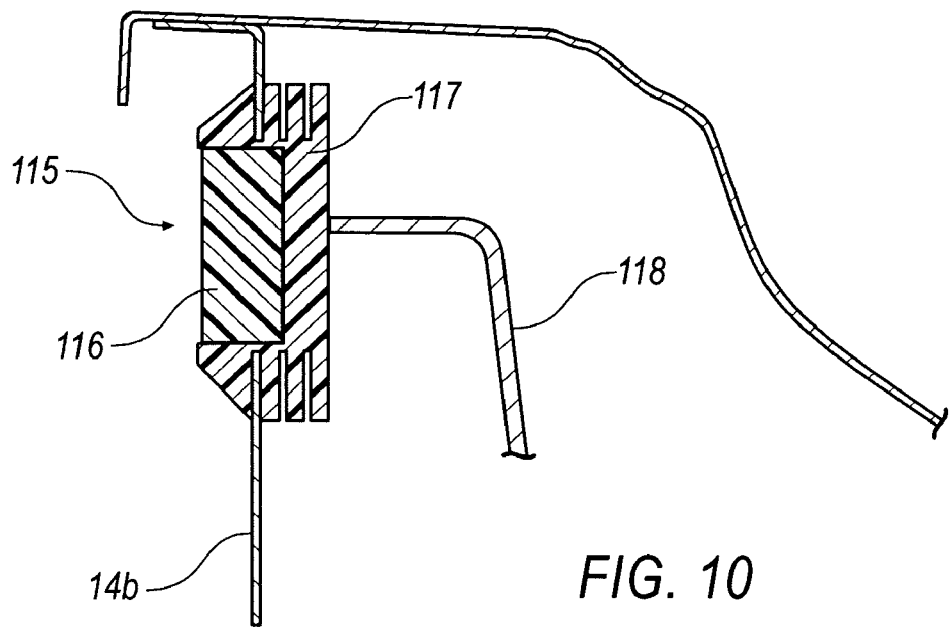
FIG. 10 is a cross-sectional view of a tailgate switch taken along lines 10-10 of FIG. 5.

An example of switch 115 that is positioned within lateral wall 14b is shown in FIG. 10. Switch 115 includes a depressible indent button 116 that is retained within a grommet 117. Connected to indent button 116 is a wiring harness 118. Wiring harness 118 is connected to controller 84. In one embodiment, grommet 117 includes a series of retaining channels that receive a portion of lateral wall 14b. By providing a series of retaining channels, multiple set locations for switch 115 are possible. As described above, depressing switch 115 will send a single to controller 84 to activate motor assembly 78 to move tailgate 16 into the open or closed position.

In one embodiment, tailgate 16 may be moved between the open and closed position via switch 115, as described above. In another embodiment, the latching mechanism is manually released by handle 23 and tailgate 16 is rotated to a predetermined angle upon which screw assembly 72 and motor assembly 78 will permit tailgate 16 to lower into the open position.

Controller 84 may further be programmed to only operate tailgate assembly 26 under certain conditions. For example, controller 84 may be programmed to prohibit release of tailgate 16 from the closed position when vehicle 10 is in a driving mode. Controller 84 may also be programmed to prohibit release of tailgate 16 if tailgate is locked. Further, controller 84 may also be programmed to provide an indicator (such as a light on the dash panel or an audible sound) to a driver upon start of vehicle 10 if tailgate 16 is in the open position.

First hinge mechanism 25 is illustrated in greater detailed in FIG. 11. In the embodiment shown, first hinge mechanism 25 is positioned in encircled area A of FIG. 1 and is not attached to a power assembly, like hinge mechanism 26. Hinge mechanism 25 includes a tailgate bracket 86, a vehicle bracket 88 and a collar 87 that contains a roller bearing (not shown). Tailgate bracket 86 is fixedly secured to tailgate 16 with one portion 86a being secured to a side edge 21 of tailgate 16 and a second portion 86b being secured to first end 18 of tailgate 16.

A driveshaft 89 is fixedly connected to vehicle bracket 88, and extends through collar 87 and through a slotted opening (not shown) formed on collar 87. The slotted opening has a slot area that is only accessible when tailgate 16 is rotated to a predetermined angle. In one particular embodiment, this angle is approximately 45°. A connection mechanism 91 may be secured to an end of collar 87 to secure collar 87 to tailgate bracket 86. Vehicle bracket 88 is fixedly connected to a portion of vehicle 10 such as wall 14a.

Tailgate 16 may optionally include a tailgate cable 93 (as best seen in FIG. 1). Tailgate cable 93 may be a stainless steel cable that may further include a protective sleeve thereon to prevent potential damage to tailgate cable 93. Tailgate cable 93 has a first end 118 that is connected to tailgate 16 closer to second end 20 than first end 18 of tailgate 16. A second end 97 is connected to a lateral wall 14a/14b. In some embodiments, a pair of tailgate cables 93 may be provided on either side of tailgate 16. When tailgate 16 is in the open position, tailgate cable 93 may partially support tailgate 16 in that position and/or as a fail/safe against potential failure of hinge mechanism 26. Further, tailgate cable 93 has a predetermined length so as to limit how far tailgate 16 may open. It is desired that at least one of the ends of tailgate cable 93 may be selectively disengaged such that tailgate 16 may be selectively removable from vehicle 10.

To selectively disconnect tailgate 16 from vehicle 10, both first and second hinge mechanisms 25 and 26, respectively, must be disconnected. In one embodiment, the process for removing tailgate 16 from vehicle 10 begins with selectively disconnecting hinge mechanism 25. To disconnect hinge mechanism 25, tailgate 16 first must be opened to a predetermined angle. In one embodiment, the predetermined angle is about 45°. Once tailgate 16 has been rotated to the predetermined angle, tailgate 16 is pulled so as to move driveshaft 89 out of engagement with a slot formed on collar 87, thereby disconnecting hinge mechanism 25.

Next, hinge mechanism 26 is disconnected to permit removal of tailgate 16 from vehicle 10. After hinge mechanism 25 is disconnected, drive cup 30 is simply pulled away and out of engagement with driveshaft 34. More specifically, drive cup 30, which is secured to tailgate bracket 28, is pulled laterally away from driveshaft 34 such that driveshaft 34 detaches from engagement with groove 57. By disengaging driveshaft 34 from drive cup 30, first and second electrical contact portions 73, 81 are also disengaged.

To reinstall tailgate 16 back on vehicle 10, drive cup 30 is simply fitted over driveshaft 34 and is moved over driveshaft 34 until first end 76 is seated within groove 57. Once driveshaft 34 is fully positioned within groove, first and second electrical contacts 73, 81 are forced into electrical engagement by spring member 69. Next, tailgate 16 is then again positioned at the predetermined angle, and driveshaft 190 of hinge mechanism 25 is re-inserted into the slot area and tailgate 16 is pushed so as fully seat driveshaft 89 within collar 87. If a tailgate cable 93 is provided, tailgate cable 93 is then engaged with a portion of vehicle 10 and a portion of tailgate 16.

The preceding description has been presented only to illustrate and describe exemplary embodiments of the methods and systems of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

I claim:

1. A selectively detachable tailgate hinge assembly for connecting a tailgate to a vehicle, comprising:
    a hinge mechanism that connects a portion of the tailgate to a portion of the vehicle, wherein at least a first portion of the hinge mechanism may be selectively detached from a second portion of the hinge mechanism;
    a first wiring harness that operatively connects to at least one component within a tailgate; wherein the first wiring harness includes a first electrical contact; and
    a second wiring harness operatively connects to a power source in the vehicle; wherein the second wiring harness includes a second electrical contact; wherein
    the first electrical contact is positioned within the first portion of the hinge mechanism and wherein the second electrical contact is positioned within the second portion of the hinge mechanism; and wherein the first and second electrical contacts are electrically engaged when the hinge mechanism is assembled and electrically disengaged when the first portion of the hinge mechanism is detached from the second portion of the hinge mechanism.

2. The tailgate hinge assembly of claim 1, wherein the hinge mechanism further comprises a drive cup that detachably receives a portion of a driveshaft.

3. The tailgate hinge assembly of claim 2, wherein the drive cup includes an annular channel formed therein for receiving a sealing member.

4. The tailgate hinge assembly of claim 2, wherein the first electrical contact is positioned in the drive cup and the second electrical contact is positioned within the drive shaft.

5. The tailgate hinge assembly of claim 2, further comprising
a cap engaged with a rear portion of the drive cup, wherein the cap further includes a first pathway formed therethrough for receiving a portion of the first wiring harness.

6. The tailgate hinge assembly of claim 5, wherein the drive cup further comprises a first groove in a front portion thereof and a channel that is in communication with the first groove formed in the rear portion thereof.

7. The tailgate hinge assembly of claim 5, wherein the first electrical contact is partially positioned within a channel of the drive cup.

8. The tailgate hinge assembly of claim 7, further comprising
a spring member that is positioned within a seat formed in the cap, wherein
the spring member biases the first electrical contact in a first direction away from the cap.

9. The tailgate hinge assembly of claim 4, wherein the driveshaft further includes an end portion having a second groove formed therein and a second pathway extending from the groove to a distal end of the driveshaft for receiving a portion of the second wiring harness.

10. The tailgate hinge assembly of claim 9, wherein the second electrical contact is disposed within the second groove.

11. The tailgate hinge assembly of claim 1, wherein the hinge mechanism further comprises: a tailgate bracket that connects to the tailgate;
a drive cup, and
a driveshaft; wherein
the drive cup selectively connects the driveshaft to the tailgate bracket such that the drive cup may be selectively detached from the driveshaft.

12. The tailgate hinge assembly of claim 11, further comprising
at least one support bracket mounted on the driveshaft.

13. The tailgate hinge assembly of claim 11, further comprising
a clevis fixedly connected to the driveshaft; wherein
the clevis operatively connects to a power assembly that that is connected to an actuation device, wherein
the clevis rotates the driveshaft to move the hinge between a first position and a second position in response to a signal received from the actuation device.

14. The tailgate hinge assembly of claim 13, wherein the actuation device is a switch that is located on a portion of the vehicle, wherein
the switch is electrically connected to the power assembly and may be activated by a user to operate the power assembly to rotate the clevis.

15. A selectively detachable tailgate assembly for a vehicle, comprising:
a tailgate movable between an open position and a closed position;
a hinge mechanism that connects a portion of the tailgate to a portion of the vehicle, the hinge mechanism comprising at least a first portion and a second portion, wherein
the first portion may be selectively detached from the second portion to permit the tailgate to be removed from the vehicle;
a first wiring harness operatively connected to at least one component housed within the tailgate; wherein
the first wiring harness includes a first electrical contact; and
a second wiring harness operatively connected to a power source in the vehicle; wherein
the second wiring harness includes a second electrical contact; wherein
the first electrical contact is positioned within the first portion of the hinge mechanism and wherein the second electrical contact is positioned within the second portion of the hinge mechanism; and wherein
the first and second electrical contacts are electrically engaged when the hinge mechanism is assembled and the tailgate is attached to the vehicle and wherein the first and second electrical contacts are electrically disengaged when the first portion of the hinge mechanism is detached from the second portion of the hinge mechanism.

16. The tailgate assembly of claim 15, further comprising a spring member that biases the first electrical contact into electrical engagement with the second electrical contact.

17. The tailgate assembly of claim 15, wherein the hinge mechanism further comprises:
a tailgate bracket fixedly connected to the tailgate;
a drive cup that is secured to the tailgate bracket,
a cap secured to a rear portion of the drive cup; and
a driveshaft; wherein
the drive cup selectively connects the driveshaft to the tailgate bracket such that the drive cup may be selectively detached from the driveshaft.

18. The tailgate assembly of claim 16, wherein:
the cap further comprises a first pathway formed therethrough in which a portion of the first wiring harness is disposed; and
the driveshaft further comprises a second pathway formed therethrough in which a portion of the second wiring harness is disposed.

19. The tailgate assembly of claim 18, wherein the first pathway is in communication with a channel that is formed in a rear portion of the drive cup; and wherein
the channel receives a portion of the first electrical contact portion.

20. The tailgate assembly of claim 19, wherein the channel is in communication with a first groove that is formed in a front portion of the drive cup and wherein the first groove receives an end of the driveshaft.

21. The tailgate assembly of claim 20, wherein the second pathway is in communication with a second groove that is formed in the driveshaft; and wherein
the second groove receives the second electrical contact portion.

* * * * *